United States Patent
Potoski et al.

[15] 3,692,791
[45] Sept. 19, 1972

[54] SUBSTITUTED 2-T-BUTYL-OCTAHYDRO-2H-QUINOLIZINES

[72] Inventors: John R. Potoski, Rosemont; Meier E. Freed, Philadelphia, both of Pa.

[73] Assignee: American Home Products Corporation, New York, N.Y.

[22] Filed: May 18, 1970

[21] Appl. No.: 38,508

[52] U.S. Cl..............................260/293.53, 424/267
[51] Int. Cl................................................C07d 39/12
[58] Field of Search......................260/293.53, 293.54

[56] References Cited

OTHER PUBLICATIONS

Matsuo et al., Yakugaku Zasshi 81, 1075– 1077 (1961).

*Primary Examiner*—Henry R. Jiles
*Assistant Examiner*—G. Thomas Todd
*Attorney*—Andrew Kafko, Edmund H. O'Brien, Joseph Martin Weigman, Dwight J. Potter, Vito Victor Bellino and Robert Wiser

[57] ABSTRACT

The disclosure is directed to 2-t-butyl-octahydro-2H quinolizines substituted in the two position and having the following formula:

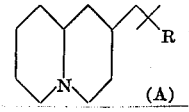

Where R is as defined below. The disclosure is further directed to a process for the preparation of such compounds and to novel intermediates in their preparation. The compounds have pharmacological activity as central nervous system depressants and some are useful as hypotensives.

6 Claims, No Drawings

SUBSTITUTED 2-T-BUTYL-OCTAHYDRO-2H-QUINOLIZINES

The invention is directed to a novel process for the preparation of substituted 2-t-butyl-octahydro quinolizines, to products of the process and to novel intermediates in the process. The compounds are prepared from octahydro-2H-quinolizin-2-one by formation of a tertiary butyl group at the 2-position followed by substitution of desired groups on the tertiary butyl moiety.

It is to be noted that the intermediate compounds II and III were unknown prior to the present invention. They are octahydro-2H-quinolizine $\Delta^{2,\alpha}$-acetic acid ethyl ester (II) and octahydro-2H-quinolizine-2-acetic acid, ethyl ester (III).

The compounds within the purview of the present invention are exemplified by the substituted 2-t-butyl-octahydro-2H-quinolizines having the following formula:

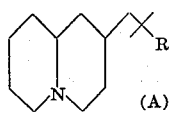

(A)

where

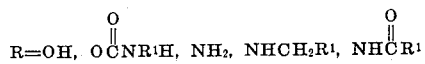

and $R^1$ is selected from the class consisting of hydrogen, lower alkyl, aryl lower alkyl, phenyl, phen(lower)alkyl and substituted phen(lower)alkyl.

As defined herein, the terms "lower alkyl" "lower alkoxy" and the like, describe groups having from one to four carbon atoms.

Typical examples of the compounds of this invention which are depicted by structural formula (A) are octahydro-$\alpha,\alpha$-dimethyl-2H-quinolizine-2-ethanol; 2-(2-amino-2-methylpropyl)-octahydro-2H-quinolizine, fumarate, hydrate; and N-[2-octahydro 2H-quinolizine-2-yl)-1,1-dimethyl]-2-(3,4,5-trimethoxyphenyl)-acetamide.

The new and useful compounds of this invention may be prepared by the process which is hereinafter schematically illustrated:

Where R and $R^1$ are as defined above.

The starting materials used in the preparation of these compounds are generally known and can be prepared by well known procedures. For instance, the starting material octahydro-2H-quinoliz-2-one (I) is a known ketone.

The octahydro-2H-quinolizine $\Delta^{2,\alpha}$-acetic acid ethyl ester (II) may be prepared by the Wittig reaction by mixing together a strong base such as sodium hydride with an ylide forming reagent, such as triethylphosphonacetate, in an appropriate solvent and octahydro-2H-quinoliz-2-one (I) and heating the mixture at about 0° to 100° C. for 5 to 60 minutes, and then allowing the reaction to go to completion at room temperature in about one-half to 2 hours. The product (II) may be recovered by well known means, for instance, extraction by benzene.

The octahydro-2H-quinolizine-2-acetic acid, ethyl ester (III) may be prepared by hydrogenating, on a Parr apparatus at a hydrogen pressure of 30 to 50 lbs. for 10 to 120 minutes, a mixture of octahydro-2H-quinolizine $\Delta^{2,\alpha}$-acetic acid ethyl ester (II) and a platinum oxide catalyst. When the reaction is complete, the product may be recovered by well known means, for instance, by filtering the catalyst and concentrating the filtrate. The concentrated filtrate may then be dissolved in ether and washed with aqueous sodium carbonate, dried, concentrated and distilled.

The octahydro-$\alpha,\alpha$-dimethyl-2H-quinolizine-2-ethanol (IV) may be prepared from octahydro-2H-quinolizine-2-acetic acid, ethyl ester by alkylation with an organo-metallic compound, such as alkyl lithium, and alkyl Grignard-type reactions. A stirred solution of octahydro-2H-quinolizine-2-acetic acid, ethyl ester (III) in ether under a dry nitrogen atmosphere has added to it a solution of methyllithium in ether. The reaction mixture is refluxed gently during the addition and for 2 to 6 hours after the addition is complete. When the reaction is complete, water is added and the ether separated. The product may be recovered by well known means, for instance, the aqueous phase may be extracted with ether and the ethereal portions combined, dried and concentrated, and the residue

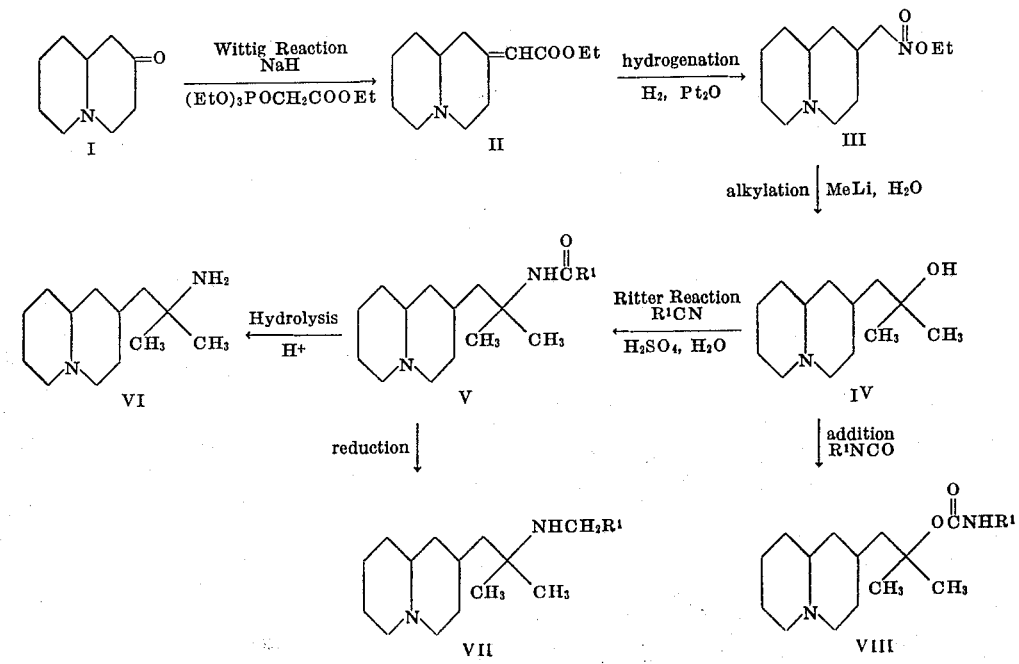

recrystallized from hexane to obtain the product.

The product may then be used as a starting material in well known processes to produce a number of novel compounds. For instance 2-(2-amino-2-methylpropyl)octahydro-2H-quinolizine, fumarate, hydrate (VI) may be prepared as follows.

To a stirred solution of sodium cyanide in acetic acid is added a cold mixture of acetic acid and sulfuric acid.

To the cooled resultant solution is added the product octahydro-$\alpha,\alpha$-dimethyl-2H-quinolizine-2-ethanol (IV) in small portions. The mixture is warmed at 60° to 100° for 1 to 6 hours, cooled and ice water is added.

When phenylacetonitrile is used instead of sodium cyanide the intermediate product (V) is prepared.

Then in either case the aqueous solution is basified for instance with solid sodium hydroxide or sodium carbonate and extracted with ether or methylenechloride. The product (V) may be recovered by well known means, for instance by acidification with hydrochloric acid, rebasification with solid sodium hydroxide and extraction with methylenechloride followed by drying and concentration of the methylenechloride extracts.

The product (VII) may be prepared by drying and concentrating the ether extracts and distilling the concentrate to provide the N-formyl derivative. The amine may be prepared in well known fashion, for instance by refluxing the formyl compound for 1 to 5 hours in hydrochloric acid, cooling the reaction solution, neutralizing it with 50 percent sodium hydroxide solution and extracting the product with ether. The ether extracts may be dried and concentrated to give the primary amine.

The product octahydro-$\alpha,\alpha$-dimethyl-2H-quinolizine-2-ethanol, carbanilate (VIII) may be prepared by heating a mixture of octahydro-$\alpha,\alpha$-dimethyl-2H-quinolizine-2-ethanol (IV) and phenylisocyanate at a temperature of about 100° to 150° for 10 to 30 minutes and cooling. When the reaction is complete, the product may be extracted with hot hexane and filtered. The filtrate may be concentrated and refiltered. Recrystallization of the crude product twice from hexane provides the pure product.

In a manner similar to that described above for product (V), substituents are inserted in the $R^1$ moiety by incorporating the substituents in the reactant. For instance, the use of 3,4,5-trimethoxybenzylnitrile provides an appropriately substituted trimethoxy compound.

In the pharmacological evaluation of the biological activity of the compounds of this invention, the in vivo effects are tested as follows. The compound is administered orally or intraperitoneally to three mice (14 to 24 grams) at each of the following doses: 400, 127, 40 and 12.7 milligrams per kilogram of host body weight (MPK). The animals are watched for a minimum of two hours during which time signs of general stimulation (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) are noted.

The compounds of this invention induce central nervous system depressant effects at a dose of 40 to 127 MPK.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. In the examples all temperatures are stated in degrees Centigrade, and the following abbreviations are used: "g." for grams, "ml." for milliliters, and "-mole" for gram molecular weight, and $\phi$- for phenyl.

EXAMPLE I

The following illustrates the preparation of octahydro-2H-quinolizine $\Delta^{2,\alpha}$-acetic acid ethyl ester, a compound of formula II.

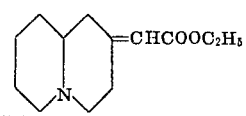

To a stirred mixture of sodium hydride (16.2 g., 0.34 mole of 50 percent dispersion in nujol) in 100 ml. of benzene under a dry nitrogen atmosphere was added triethylphosphonacetate (77 g., 0.36 mole) over a period of 45 minutes. The resultant mixture was stirred for 1 hour. To this mixture was then added octahydro-22H-quinoliz-2-one over a period of 35 minutes. The reaction mixture was warmed to 65° for 15 minutes then allowed to stir at room temperature for 1 hour. The benzene was then decanted. A 50 ml. portion of benzene was then added to the mixture, and it was warmed to 60° for a few minutes, cooled and the benzene again decanted. This wash was repeated with 2 more 50 ml. portions of benzene. The combined benzene portions were concentrated and distilled to give product with a boiling point of 117°–120° at 0.75 mm and weighing 67.6 g., and 89 percent yield.

Based on the assumed molecular formula of $C_{13}H_{21}NO_2$ it was calculated that the elemental analysis by weight would be 69.92 percent carbon and 9.48 percent hydrogen. The product was analyzed and found to contain 69.78 percent carbon and 9.41 percent hydrogen which confirmed the accuracy of the assumed formula. This may be expressed:

Anal. Calcd. for $C_{13}H_{21}NO_2$:C, 69.92; H, 9.48.
Found:C, 69.78; H, 9.41.

Following the above procedure but substituting appropriate starting materials for triethylphosphonacetate other lower alkyl esters may be prepared including methyl, propyl, isopropyl, butyl and tertiary butyl.

The product was tested in the foregoing pharmacological procedure and found to reduce motor activity at a dose of 127 MPK administered orally or parenterally, and to reduce respiration at a dose of 40 MPK administered parentally.

EXAMPLE II

The following illustrates the preparation of octahydro-2H-quinolizine-2-acetic acid, ethyl ester, a compound of formula III.

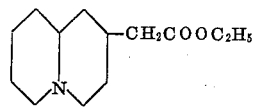

A mixture of octahydro-2H-quinolizine $\Delta^{2}$·α-acetic acid ethyl ester (25 g., 0.112 mole), acetic acid (13 ml.), ethanol (100 ml.) and platinum oxide (400 mg.) was hydrogenated on a Parr apparatus at 42 lb. hydrogen pressure for 30 minutes. The catalyst was filtered and the filtrate was concentrated to give an oily residue. This residue was dissolved in ether, washed with aqueous sodium carbonate, dried and concentrated. The residue thus obtained was distilled through a small Vigoreaux to give product with a boiling point of 110°–112° at 0.75 mm and weighing 22.2 g., an 88 percent yield.

Anal. Calcd. for $C_{13}H_{23}NO_2$:C, 69.29; H, 10.29; N, 6.22.
Found:C, 69.32; H, 10.01; N, 6.17.

Following the above procedure but substituting an appropriate compound for octahydro-2H-quinolizine $\Delta^{2}$· -acetic acid ethyl ester other lower alkyl esters may be prepared including methyl, propyl, isopropyl, butyl and tertiary butyl.

The product was tested in the foregoing pharmacological procedure and found to reduce motor activity at a dose of 127 MPK administered orally.

EXAMPLE III

The following illustrates the preparation of octahydro-α,α-dimethyl-2H-quinolizine-2-ethanol, a compound of formula IV.

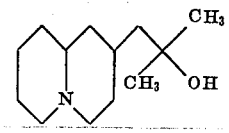

To a stirred solution of octahydro-2H-quinolizine-2-acetic acid, ethyl ester (40.0 g., 0.18 mole) in 450 ml. of ether under a dry nitrogen atmosphere was added a solution of methyllithium in ether (400 ml. of 5 percent solution, 0.6 m). The reaction mixture refluxed gently during the addition. After the addition was completed, the mixture was refluxed for 4 hours. Water (500 ml.) was added, and the ether was separated. The aqueous phase was washed three times with 300 ml. of ether, and the combined ethereal portions were dried and concentrated to give a viscous oil. Crystallization of the oil from hexane (about 150 ml.) gave 24.5 g. of product with a melting point of 66°–70°. An additional 2.2 g. of product with a melting point of 62°–66° was obtained from the mother liquors giving a total yield of 26.7 g., 71 percent. The analytical sample on recrystallization from hexane had a melting point of 71°–73°.

Anal. Calcd. for $C_{13}H_{15}NO$:C, 73.88; H, 11.92; N, 6.63.
Found:C, 73.23; H, 11.07; N, 6.79.

The product was tested in the foregoing pharmacological procedure and found to reduce motor activity and reduce respiration at a dose of 127 MPK administered orally.

EXAMPLE IV

The following illustrates the preparation of 2-(2-amino-2-methylpropyl)octahydro-2H-quinolizine, fumarate, hydrate, a compound of formula VI.

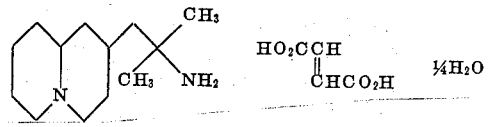

To a stirred solution of sodium cyanide (2.5 g., 0.05 mole) in acetic acid (6 ml.) was added a cool mixture of 6 ml. acetic acid and 6 ml. of sulfuric acid. To the cooled resultant solution was then added octahydro-α,α-dimethyl-2H-quinolizine-2-ethanol (7.0 g., 0.033 mole) in small portions. The temperature of the mixture rose to 38°–40°. The mixture was warmed for 80° for 3 hours, cooled and treated with 75 ml. of ice water. The aqueous solution was basified with solid sodium carbonate and extracted with ether. The ether extracts were dried and concentrated to give an oil which was distilled to give the N-formyl derivative with a boiling point of 155°–158° at 0.1 mm and weighing 3.0 g. The N-formyl compound (3.0 g.) was refluxed for 3½ hours in 20 ml. of 6 percent hydrochloric acid. The reaction solution was cooled, neutralized with 50 percent sodium hydroxide solution and extracted with ether. The ether extracts were dried and concentrated to give 2.4 g. of crude primary product (34 percent yield from alcohol). The liquid amine was converted to its fumaric acid derivative in the usual manner giving 3.5 g. of product with a melting point of 189°–196°. Recrystallization of the derivative from isopropanol gave 1.1 g. with a melting point of 225°–227°.

Anal. Calcd. for $C_{13}H_{26}N_2 \cdot C_4H_4O_4 \cdot 1/4\ H_2O$:C, 61.70; H, 9.29; N, 8.47.

Found:C, 61.81; H, 9.03; N, 8.54.

The product was tested in the foregoing pharmacological procedure and found to reduce motor activity and reduce respiration at a dose of 40 MPK administered parenterally.

EXAMPLE V

The following illustrates the preparation of octahydro-α,α-dimethyl-2H-quinolizine-2-ethanol, carbanilate, a compound of formula VIII.

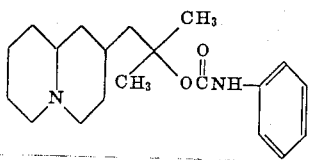

A mixture of alcohol, octahydro-α,α-dimethyl-2H-quinolizine-2-ethanol (2.0 g., 0.01 mole) and phenylisocyanate (1.4 ml.) was warmed to 120°–125° for 15 minutes and allowed to cool. The resultant oily-solid mixture was treated with hot hexane and filtered. The filtrate was concentrated to about 30 ml. and cooled; 2.4 g. of crude product was filtered. Recrystallization of the crude product two times from hexane gave 1.60 g. (51 percent yield) of pure product with a melting point of 113°–115°.

Anal. Calcd. for $C_{20}H_{30}N_2O_2$:C, 72.69; H, 9.15; N, 8.48.
Found:C, 73.10; H, 9.16; N, 8.53.

The product was tested in the foregoing pharmacological procedure and found to reduce motor activity and reduce respiration at a dose of 127 MPK administered orally.

Following the above procedure but substituting appropriate starting materials, compounds having the following substituents may be obtained:

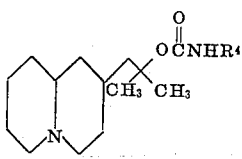

| Example V | $R^4$ |
|---|---|
| V-1 | φ— |
| -2 | $CH_3$— |
| -3 | $C_2H_5$— |
| -4 | $C_3H_7$— |
| -5 | i—$C_3H_7$— |
| -6 | $C_4H_9$— |
|  | t—$C_4H_9$— |

EXAMPLE VI

The following illustrates the preparation of N-[2(octahydro-2H-quinolizine-2-yl)-1,1-dimethylethyl]-2-phenylacetamide, a compound of formula V.

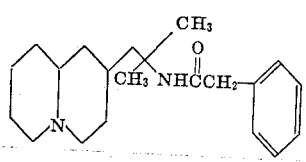

To a stirred solution of phenylacetonitrile (1.4 g., 0.012 mole), acetic acid (10 ml.) and sulfuric acid (2.0 g., 0.01 mole) was added the octahydro-α,α-dimethyl-2H-quinolizine-2-ethanol (2.1 g., 0.01 mole). The reaction temperature rose to 30° and the solution was warmed to 70° for 2 hours and allowed to stand at room temperature overnight. The reaction mixture was poured into 25 g. of ice water. The aqueous solution was basified with solid sodium hydroxide and extracted with methylene chloride. The methylchloride solution was extracted with 2 percent hydrochloric acid. The acid extracts were rebasified with solid sodium hydroxide and extracted with methylene chloride. The methylene chloride extracts were dried and concentrated to give 2.7 g. of crude product with a melting point of 92°–99°. Recrystallization of the crude product from hexane two times gave 1.7 g., (52 percent yield) of product with a melting point of 104°–106°.

Anal. Calcd. for $C_{21}H_{32}N_2O$:C, 76.78; H, 9.82; N, 8.53.
Found:C, 76.84; H, 10.10; N, 8.51.

The produce was tested in the foregoing pharmacological procedure and found to reduce motor activity and reduce respiration at a dose of 127 MPK administered orally.

The product was also found to be a good antiinflammatory when tested in suitable pharmacological procedures.

Following the above procedure but substituting appropriate starting materials, compounds having the following substituents may be obtained:

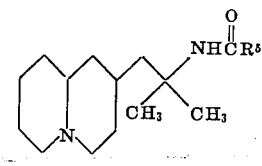

| Example VI | $R^4$ |
|---|---|
|  | φ$CH_2$— |
| VI-1 | $CH_3$— |
| -2 | $C_2H_5$— |
| -3 | $C_3H_7$— |
| -4 | i—$C_3H_7$— |
| -5 | $C_4H_9$— |
| -6 | t—$C_4H_9$— |
| -7 | φ$C_2H_4$— |
| -8 | φ$C_3H_6$— |
| -9 | φ$C_4H_8$— |

EXAMPLE VII

The following illustrates the preparation of N-[2-(octahydro-2H-quinolizin-2-yl)-1,1-dimethyl]-2-(3,4,5-trimethoxyphenyl)acetamide, a compound of formula V.

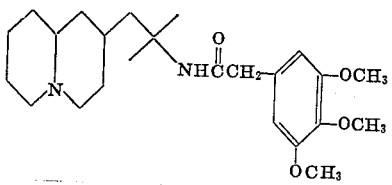

In a manner similar to that described in Example VI, from 5.0 g. (0.024 mole) of the octahydro-α,α-dimethyl-2H-quinolizine-2-ethanol and 5.2 g. (0.025 mole) of 3,4,5-trimethoxybenzylnitrile was obtained 9.5 g. of crude product as a viscous oil. Distillation of the oil gave 6.9 g. (69 percent yield) of product with a boiling point of 232°–234° at 0.5 mm.

Anal. Calcd. for $C_{24}H_{38}N_2O_4$:C, 68,86; H, 9.15; N, 6.69.
Found:C, 68.67; H, 8.96; N, 6.54.

What is claimed is:

1. Octahydro-2H-quinolizine $\Delta^{2,\alpha}$-acetic acid ethyl ester.

2. Octahydro-α,α-dimethyl-2H-quinolizine-2-ethanol.

3. 2-(2-amino-2-methylpropyl)octahydro-2H-quinolizine, fumarate, hydrate.

4. Octahydro-α,α-dimethyl-2H-quinolizine-2-ethanol, carbanilate.

5. N-[2-(octahydro-2H-quinolizine-2-yl)-1,1-dimethylethyl]-2-phenylacetamide.

6. N-[2-(octahydro-2H-quinolizin-2-yl)-1,1-dimethyl]-2-(3,4,5-trimethoxyphenyl)acetamide.

* * * * *

PO-1050
(5/69)

UNITED STATES PATENT OFFICE
CERTIFICATE OF CORRECTION

Patent No. 3,692,791     Dated September 19, 1972

Inventor(s) John R. Potoski and Meier E. Freed

It is certified that error appears in the above-identified patent and that said Letters Patent are hereby corrected as shown below:

At column 2, Formula III should read as follows:

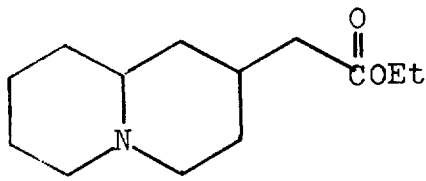

III

Signed and sealed this 13th day of March 1973.

(SEAL)
Attest:

EDWARD M. FLETCHER, JR.            ROBERT GOTTSCHALK
Attesting Officer                  Commissioner of Patents